United States Patent
Li et al.

(10) Patent No.: US 8,381,086 B2
(45) Date of Patent: Feb. 19, 2013

(54) SYNCHRONIZING SLIDE SHOW EVENTS WITH AUDIO

(75) Inventors: Barn-Wan Li, San Jose, CA (US); Kai Chung Lui, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 11/857,431

(22) Filed: Sep. 18, 2007

(65) Prior Publication Data

US 2009/0077460 A1    Mar. 19, 2009

(51) Int. Cl.
  *G06F 17/00* (2006.01)
(52) U.S. Cl. .................... 715/203; 715/201; 715/202
(58) Field of Classification Search .................. 715/201, 715/202, 203
  See application file for complete search history.

(56) References Cited

U.S. PATENT DOCUMENTS

| | | | |
|---|---|---|---|
| 5,949,410 A | 9/1999 | Fung | |
| 6,181,351 B1 | 1/2001 | Merrill et al. | |
| 6,728,753 B1 | 4/2004 | Parasnis et al. | |
| 6,772,170 B2 * | 8/2004 | Pennock et al. | 1/1 |
| 6,892,351 B2 | 5/2005 | Vasudevan et al. | |
| 7,669,132 B2 * | 2/2010 | Widdowson | 715/732 |
| 7,793,208 B2 * | 9/2010 | Iampietro et al. | 715/203 |
| 2002/0193895 A1 * | 12/2002 | Qian et al. | 700/94 |
| 2003/0164845 A1 | 9/2003 | Fayan et al. | |
| 2004/0014013 A1 * | 1/2004 | Diesel et al. | 434/118 |
| 2004/0054542 A1 * | 3/2004 | Foote et al. | 704/500 |
| 2005/0188297 A1 | 8/2005 | Knight et al. | |
| 2005/0217462 A1 * | 10/2005 | Thomson et al. | 84/612 |
| 2005/0275805 A1 * | 12/2005 | Lin et al. | 352/12 |
| 2005/0278625 A1 * | 12/2005 | Wessling et al. | 715/527 |
| 2006/0152678 A1 * | 7/2006 | Hung et al. | 352/12 |
| 2006/0184868 A1 | 8/2006 | Chen et al. | |
| 2006/0214934 A1 * | 9/2006 | Foote | 345/473 |
| 2006/0282874 A1 * | 12/2006 | Ito et al. | 725/139 |
| 2007/0174307 A1 * | 7/2007 | Villaron et al. | 707/100 |

(Continued)

FOREIGN PATENT DOCUMENTS

| | | |
|---|---|---|
| CN | 1973536 A | 5/2007 |
| WO | WO2005069635 A1 | 7/2005 |

(Continued)

OTHER PUBLICATIONS

"Synchronizing Multimedia Events with Streaming RealAudio", University of Texas Houston, 1997, pp. 1-3.

(Continued)

*Primary Examiner* — Stephen Hong
*Assistant Examiner* — Matthew Ludwig
(74) *Attorney, Agent, or Firm* — Hope Baldauff Hartman, LLC (57) ABSTRACT

Technologies are described herein for synchronizing slide show events with audio. Data defining one or more animation events, slide transitions, or visual effects and an audio file to be played during the defined events is received. The audio file is processed to identify the audio events contained therein. Once the audio events in the audio file have been identified, the defined animation events are synchronized to the identified audio events using an audio synchronization scheme that includes data defining how the audio events are to be synchronized to the animation events. A user interface may be provided that allows a user to select an audio synchronization scheme to be applied to a presentation. A user interface may also be provided that allows a user to visually associate an animation event with any audio event identified within an audio file.

15 Claims, 8 Drawing Sheets

U.S. PATENT DOCUMENTS

2007/0223874 A1 9/2007 Hentschel
2008/0016114 A1* 1/2008 Beauregard et al. ....... 707/104.1

FOREIGN PATENT DOCUMENTS

WO    WO2006054126 A1    5/2006

OTHER PUBLICATIONS

Chow, "Media Synchronization", retrieved at <<http://cs.uccs.edu/~cs525/synmm/synmm.htm>>, pp. 1-25.

"Audio Visual Speech Technologies", retrieved at <<http://www.research.ibm.com/AVSTG/sed.html>>, p. 1.

Doenges, et al., "MPEG-4: Audio/Video & Synthetic Graphics/Audio for Mixed Media", Image Communications Journal, 1997, pp. 1-41.

International Search Report dated Jan. 29, 2009 in International Application No. PCT/US2008/074233.

European Search Report dated Jan. 31, 2011 in European Application No. 08798461.0-2201.

Chow, "Media Synchronization", downloaded May 7, 2007 from http://cs.uccs.edu/-cs525/synmm/synmm.htm, 25 pages.

"Audio Visual Speech Technologies", downloaded May 7, 2007 from http://www.research.ibm.com/AVSTG/sed.html, 1 page.

Chinese Official Action dated Nov. 16, 2011 in Chinese Application No. 200880107308.9.

Australian Official Action dated May 31, 2012 in Australian Application No. 2008302614.

Russian Official Action dated Mar. 22, 2012 in Russian Application No. 2010110132/08(014224).

* cited by examiner

SYNCHRONIZING SLIDE SHOW EVENTS WITH AUDIO

BACKGROUND

Presentation application programs provide functionality for creating and delivering audiovisual presentations. Typically, presentations take the form of one or more presentation slides. Each presentation slide can include numerous objects, such as text, photographs, lists, tables, charts, shapes, clip art, movies, and others. Presentation slides can be displayed on-screen and navigated through at the command of a user in order to deliver the presentation.

Many presentation application programs provide functionality for animating and applying visual effects to the objects on each presentation slide and for animating and applying visual effects to the transitions between presentation slides. For instance, using the functionality provided by typical presentation application programs, a user could define a motion path for an object on a presentation slide. When the presentation slide is displayed, the presentation application program will cause the object to be animated along the defined motion path. A user may manually define other types of animation and visual effects properties to be applied to a presentation object in a similar manner.

Many presentation application programs also provide functionality for playing an audio file during a presentation. However, it has traditionally been difficult for a user to synchronize animation events within a presentation to interesting time points within an audio file. For instance, a user may want the animation of text and graphics within a presentation to occur as each main beat of an audio file is played. Users previously achieved this result by listening to the audio file repeatedly to identify the interesting audio events within the audio file, and then manually aligning the start times of the slide show events with the manually identified audio events. This is a tedious and time-consuming process that is frustrating to users and which, in many cases, provides results that are less than ideal.

It is with respect to these considerations and others that the disclosure made herein is presented.

SUMMARY

Technologies are described herein for synchronizing slide show events with audio. In particular, through the utilization of the technologies and concepts presented herein, audio events in an audio file can be identified in an automated fashion. For instance, the main beat, silent passages, or instrumental passages in an audio file can be identified. The identified audio events are then synchronized to slide show events, such as animations, visual effects, and slide transitions, also in an automated fashion. In this way, audio events can be easily synchronized to slide show events without requiring a user to manually identify the audio events or to manually synchronize the audio events to slide show events.

According to one aspect presented herein, data defining one or more animation events, slide transitions, or visual effects is received. For instance, a user may utilize a graphical user interface to define these events. The user may also specify an audio file to be played during the performance of the defined events. The audio file is processed to identify the audio events contained therein. Audio events represent the point in time at which any important audible event is played in the audio file, such as beats, instrumental passages, silent passages, and others. According to one aspect, audio events are identified by locating the audio onsets in the audio file. Audio onsets are time points in the audio file at which the audio energy level at a particular frequency rises above or below a specified threshold. The located audio onsets may be filtered to provide an appropriate number of audio events for synchronization.

Once the audio events in the audio file have been identified, the defined animation events are synchronized to the identified audio events using an audio synchronization scheme. An audio synchronization scheme is a "recipe" that includes data defining how the audio events are to be synchronized to the animation events. For instance, according to embodiments, the data in the audio synchronization scheme specifies an offset between each audio event and a corresponding animation event. In this way, instructions can be provided that trigger an animation event prior to, at the same time as, or after the occurrence of an audio event.

In other embodiments, the data in the audio synchronization scheme specifies whether each audio event should be synchronized with the beginning or the end of a corresponding animation event. The data may also specify whether all or a subset of the audio events should be synchronized with animation events. For instance, using such data every fourth audio event may be synchronized with an animation event. Data may also specify how the subset of the audio events is to be selected. Other types of instructions may be similarly provided within an audio synchronization scheme that define how the audio events are to be synchronized to the animation events.

Through the definition of multiple audio synchronization schemes, different "moods" may be created for synchronizing animation events with audio. In one embodiment, a mood gallery user interface is provided that allows a user to select the audio synchronization scheme to be applied to a presentation. The audio synchronization schemes may be given names that describe the "mood" that they convey when applied to a presentation. For instance, audio synchronization schemes may be defined that convey a happy or a persuasive mood.

According to other embodiments, a user interface is also provided that displays a waveform of the audio file along a timeline. Indicators corresponding to identified audio events are also displayed on the waveform. The user interface also allows a user to manually associate animation events with audio events shown on the waveform. For instance, using an appropriate user input device, a user could move an object corresponding to an animation along the timeline. In response thereto, the start and/or ending time of the animation event will snap to the indicators corresponding to the audio events shown on the waveform. In this manner, the user interface provided herein allows a user to visually associate an animation event with any audio event identified within an audio file.

It should be appreciated that although the features presented herein are described in the context of a presentation application program, these features may be utilized with any type of computer program that provides functionality for playing an audio soundtrack while animating objects, performing visual effects, or displaying transitions. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for synchronizing slide show events with audio events. Through the use of the embodiments presented herein, audio events in an audio file can be identified in an automated fashion and synchronized to slide show events, such as animations, visual effects, and slide transitions, without requiring a user to manually identify the audio events or to manually synchronize the audio events to slide show events. Additional details regarding the various embodiments presented herein will be provided below with reference to FIGS. 1-8.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology synchronizing slide show events and audio events will be described.

Figure 1:
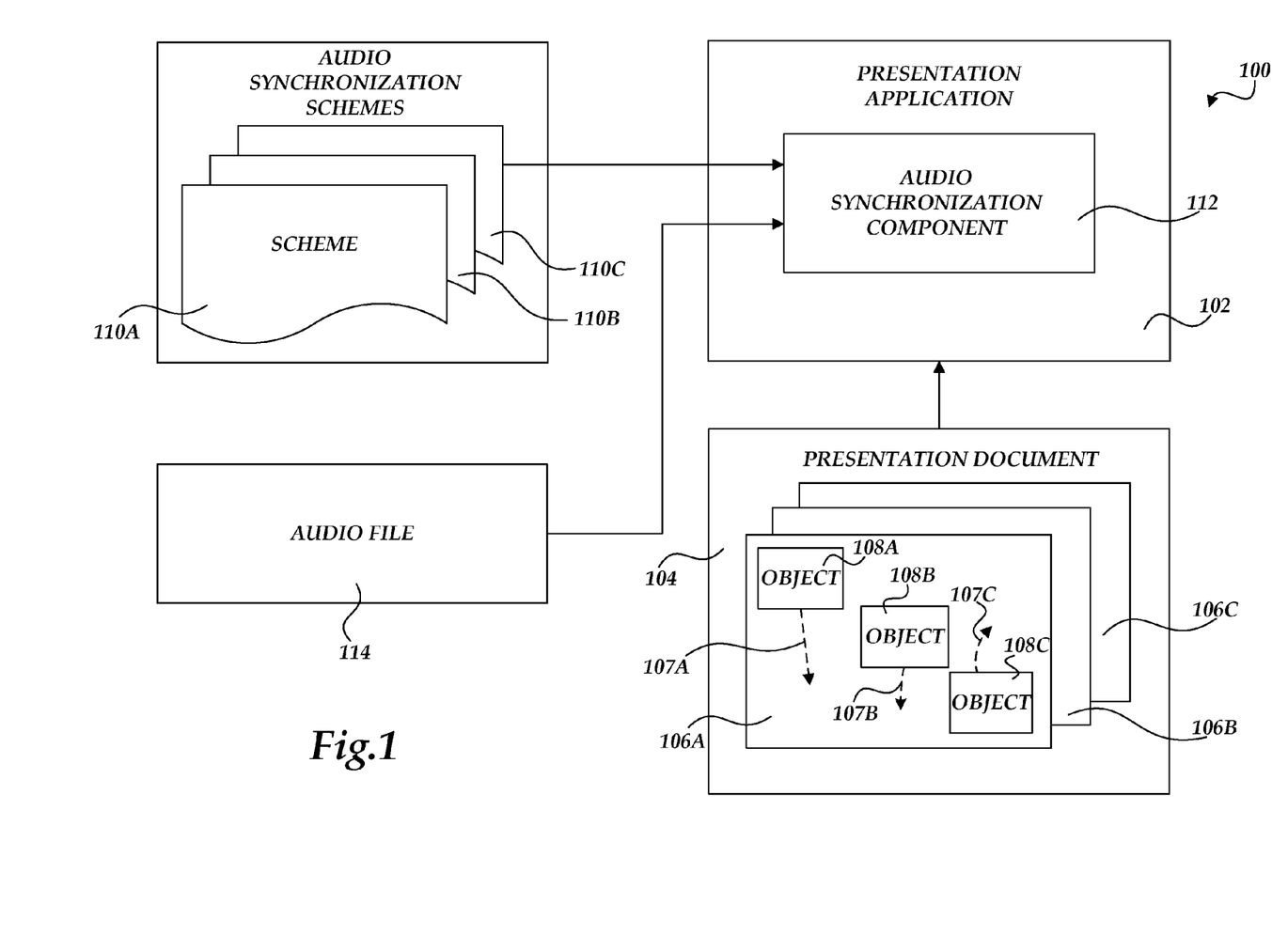
FIG. 1 is a software architecture diagram illustrating aspects of a presentation application provided in one implementation presented herein.

Turning now to FIG. 1, details will be provided regarding one embodiment presented herein for synchronizing slide show events with audio events. In particular, FIG. 1 illustrates aspects of a software architecture utilized to synchronize slide show events according to one implementation presented herein. As shown in FIG. 1, the embodiments presented herein are described in the context of a presentation application program 102. The presentation application 102 provides functionality for creating and delivering audiovisual presentations. Typically, presentations take the form of one or more presentation slides 106A-106C contained within a presentation document 104. Each of the presentation slides 106A-106C can include numerous objects 108A-108C, such as text, photographs, lists, tables, charts, shapes, clip art, and movies. Other types of audiovisual objects may also be utilized. The presentation slides 106A-106C can be displayed on a computer display screen and navigated through at the command of a user in order to deliver the presentation defined in the presentation document 104.

The presentation application 102 also includes functionality for animating and applying visual effects to the objects 108A-108C and to transitions between the presentation slides 106A-106C. For instance, a user may utilize functionality provided by the presentation application 102 to create animation events 107A-107C for the objects 108A-108C. The animation events 107A-107C shown in FIG. 1 cause the objects 108A-108C to move along a motion path. It should be appreciated, however, that other types of two-dimensional and three-dimensional animations might also be defined. Similarly, visual effects may be applied to the objects 108A-108C. For instance, visual effects may be defined that cause the objects 108A-108C to fade in/out or dissolve. Transition effects may also be defined that cause animation effects or visual effects to be displayed during the switch, or transition, between two of the presentation slides 106A-106C. Slide show events include animation events, visual effects, transition events, and any other type of visual event that may be defined within a presentation application program.

In one embodiment, the presentation application 102 also includes functionality for synchronizing audio events within an audio file 114 to defined slide show events. In order to provide this functionality, the presentation application 102 includes an audio synchronization component 112 that performs processing for identifying the audio events within the audio file 114. This process will be described below with reference to FIGS. 4-6. The presentation application 102 also provides functionality for synchronizing the identified audio events with slide show events defined within the presentation document 104. In this regard, the presentation application 102 also provides a user interface for allowing a user to manually adjust the synchronization of audio events and slide show events generated by the audio synchronization component 112. Details regarding this user interface will be provided below with respect to FIG. 7.

According to various embodiments presented herein, the audio synchronization component 112 utilizes an audio synchronization scheme 110A to determine how the audio events should be synchronized with the slide show events. An audio synchronization scheme 110A is a "recipe" that includes data defining how the audio events are to be synchronized to slide show events. For instance, according to embodiments, the data in an audio synchronization scheme 110A specifies an offset between each audio event and a corresponding animation event. In this way, instructions can be provided that trigger a slide show event prior to, at the same time as, or after the occurrence of an audio event.

In other embodiments, the data in an audio synchronization scheme 110A specifies whether each audio event should be synchronized with the beginning or the end of a corresponding animation event. The data may also specify whether all or a subset of the audio events should be synchronized with animation events. For instance, using such data every fourth audio event may be synchronized with an animation event. Data may also specify how the subset of the audio events is to be selected. Other types of instructions may be similarly provided within an audio synchronization scheme 110A that define how audio events are to be synchronized to the animation events.

Through the definition of multiple audio synchronization schemes 110A-110C, different "moods" may be created for synchronizing animation events with audio. In one embodiment, a mood gallery user interface is provided that allows a user to select one of the audio synchronization schemes 110A-110C to be applied to a presentation document 104. The audio synchronization schemes 110A-110C may be given names that describe the "mood" that they convey when applied to a presentation. For instance, audio synchronization schemes may be defined that convey a happy or a persuasive mood. Additional details regarding the mood gallery user interface will be provided below with respect to FIG. 3.

Figure 2:
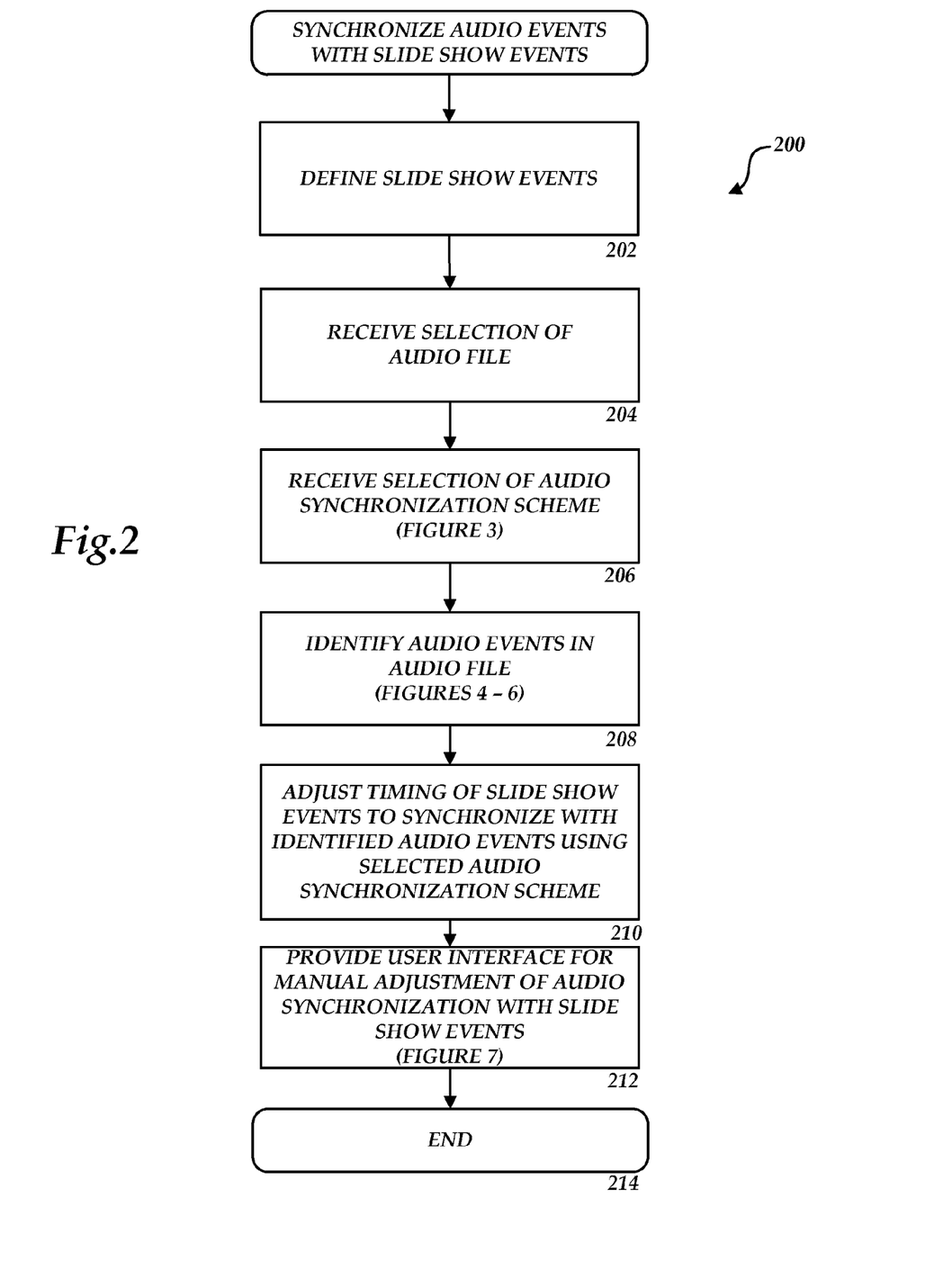
FIG. 2 is a flow diagram showing an illustrative routine for synchronizing slide show events with audio events in one implementation described herein.

Referring now to FIG. 2, additional details will be provided regarding the embodiments presented herein for synchronizing slide show events with audio events. In particular, FIG. 2 shows a flow diagram describing a routine 200 for synchronizing slide show events with audio events. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where a user defines slide show events within a presentation. For instance, utilizing functionality provided by the presentation application 102, a user may define animation events, visual effects, transition events, or other types of events with respect to the objects 108A-108C or the presentation slides 106A-106C. Once the user has created the desired slide show events, the routine 200 proceeds from operation 202 to operation 204.

At operation 204, the presentation application 102 receives the selection of an audio file 114. For instance, in one implementation, a user may specify an audio file 114 to be played during the presentation of the slide show events defined at operation 202, above. The audio file 114 may be formatted as a standard WAV audio file, an MP3 audio file, or may be formatted utilizing another type of audio format. It should also be appreciated that the audio file 114 may be contained within another type of file. For instance, the audio file 114 may comprise the audio data contained within a video file. In such an embodiment, the aspects presented herein may be utilized to synchronize slide show events to the audio events in a video file. This also permits the synchronization of effects, transitions, and other types of functions that are applied to a video file with the audio data contained therein.

Figure 3:
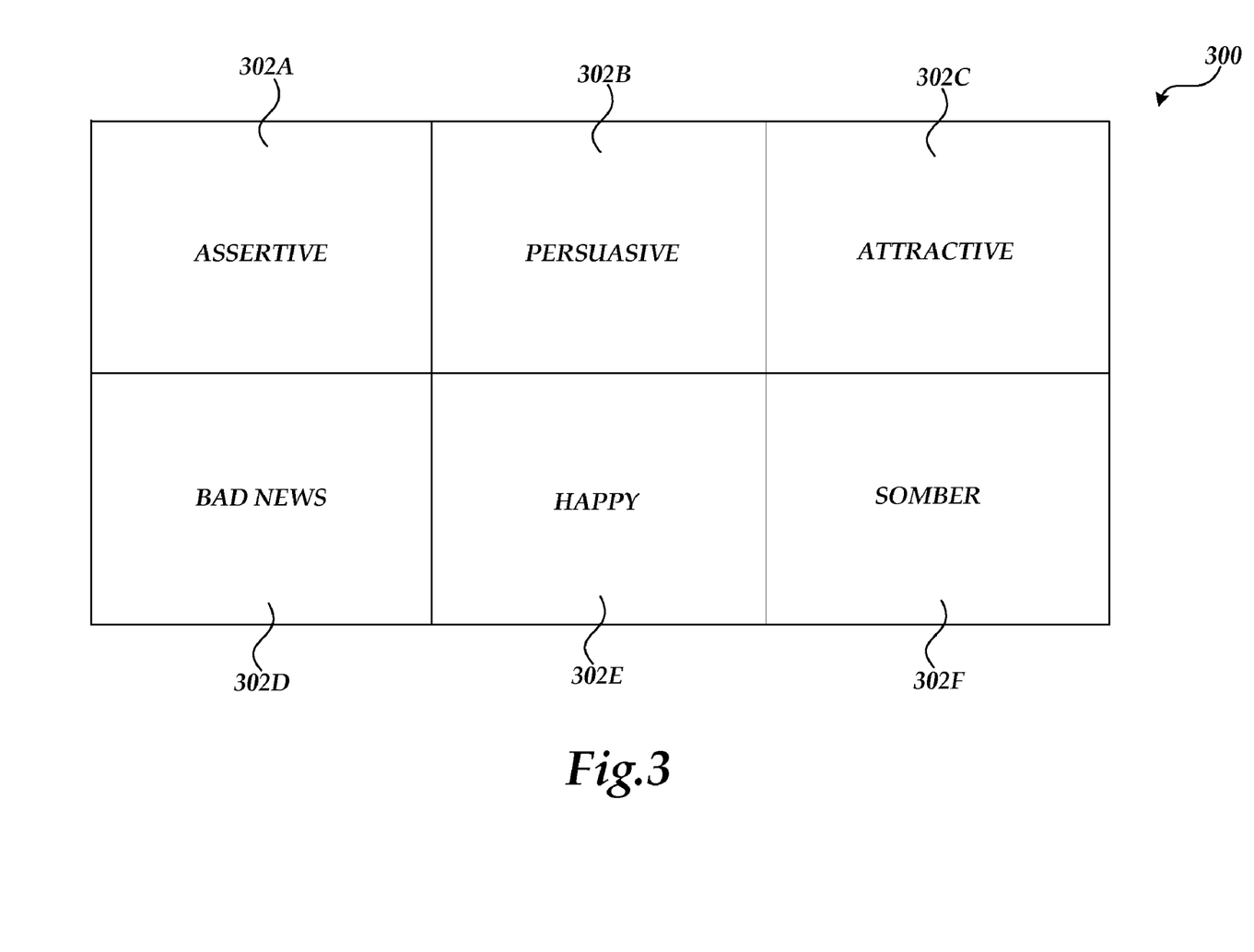
FIG. 3 is a user interface diagram showing an illustrative mood gallery through which a user may select an audio synchronization scheme in one implementation presented herein.

Once the user has selected the audio file 114 to be synchronized with the slide show events, the routine 200 continues to operation 206. At operation 206, the user is permitted to select one of the audio synchronization schemes 110A-110C to be used in synchronizing the audio events in the audio file 114 to the defined slide show events. According to one implementation, the "mood" gallery user interface 300 shown in FIG. 3 is presented to allow the user to select the desired audio synchronization scheme 110. As shown in FIG. 3, the "mood" gallery user interface 300 includes a number of user interface buttons 302A-302F, each button 302 corresponding to a particular audio synchronization scheme 110.

In one implementation, multiple audio synchronization schemes 110A-110C are created that convey different "moods" for synchronizing animation events with audio. The audio synchronization schemes 110A-110C are also given names that describe the "mood" that they convey when applied to a presentation. These names may be reflected on the buttons 302A-302F that correspond to each audio synchronization scheme. For instance, the button 302A corresponds to an audio synchronization scheme which, when applied to a presentation, will cause the slide show events defined therein to be synchronized to the audio events in the audio file 114 in an assertive way. The user utilizes an appropriate user input device to select one of the buttons 302A-302F and the corresponding audio synchronization scheme 110.

Returning now to FIG. 2, once the audio synchronization scheme 110 has been selected at operation 206, the routine 200 proceeds to operation 208. At operation 208, the audio events in the selected audio file 114 are identified. Details regarding one illustrative process for identifying interesting audio events within an audio file 114 are provided below with respect to FIGS. 4-6. Once the audio events in the audio file 114 have been identified, the routine 200 proceeds from operation 210 to operation 212.

At operation 212, the audio synchronization component 112 synchronizes the slide show events defined above at operation 202 with the audio events identified at operation 208. In particular, according to one implementation, the audio synchronization component 112 adjusts the timing of the defined slide show events to correspond to the identified audio events. In one implementation, this is done using the audio synchronization scheme 110 selected at operation 206, above. Based on the contents of the selected audio synchronization scheme 110, audio events may be synchronized with the beginning or the end of a corresponding slide show event, all or a subset of the audio events may be synchronized with slide show events, or other modifications may be made to how the slide show events are synchronized with the audio events to provide the desired "mood."

Once the slide show events have been synchronized with the identified audio events, the routine 200 continues to operation 212 where the user is provided an opportunity to manually adjust the synchronization performed by the audio synchronization component. For instance, in one implementation, a user interface is provided through which a user can manually adjust the synchronization between slide show events and audio events. One illustrative user interface for performing this process is described below with respect to FIG. 7. Once the user has made any adjustments, the audio file 114 and the slide show events may be played back in synchronicity. From operation 212, the routine 200 continues to operation 214 where it ends.

Figure 4:
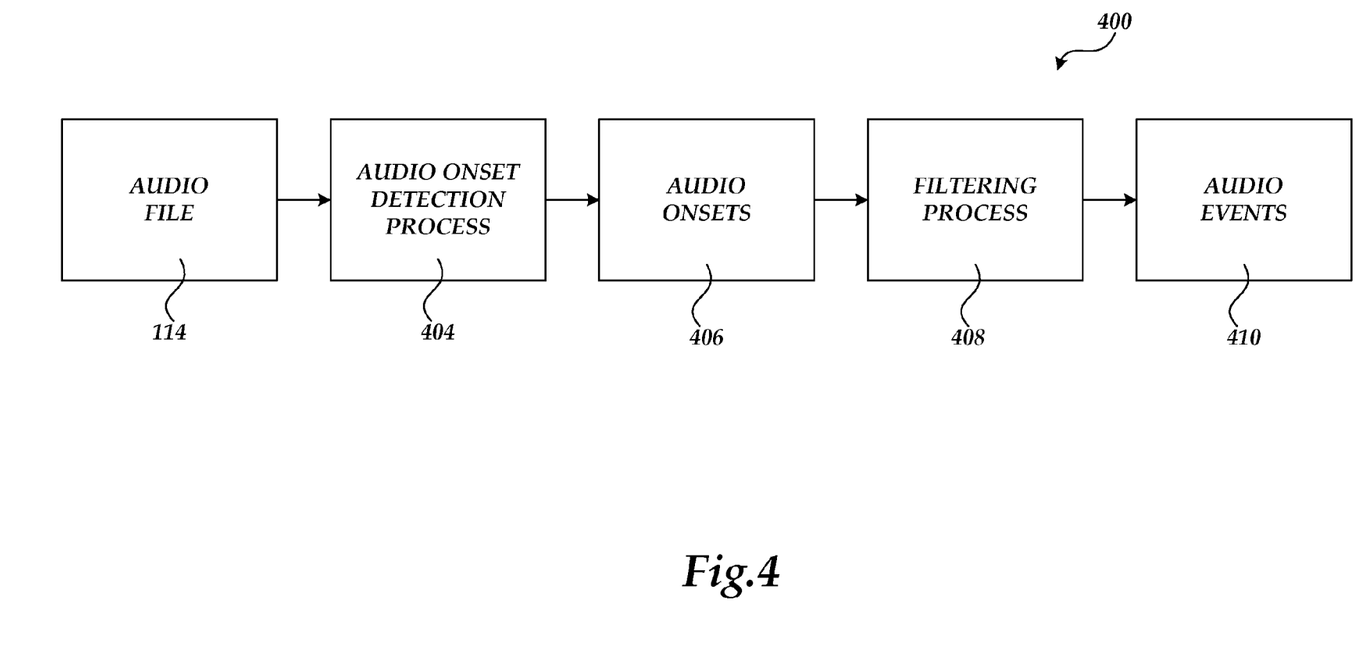
FIG. 4 is a process diagram showing an illustrative process for identifying audio events within an audio file according to one implementation presented herein.

FIG. 4 shows an overview of one illustrative process provided herein for identifying one or more audio events 410 within an audio file 114. As discussed briefly above, the audio events 410 represent the time points at which important audible events in the audio file, such as beats, instrumental passages, silent passages, and others, are located. The audio events 410 are identified by performing an audio onset detection process 404 that locates the audio onsets 406 in the audio file 114. The audio onsets 406 are time points in the audio file at which the audio energy level at a particular frequency rises above or below a specified threshold. Details regarding an illustrative audio onset detection process 404 utilized in one embodiment will be provided below with respect to FIGS. 5-6.

In one implementation, a filtering process 408 is utilized to filter the located audio onsets 406 to provide an appropriate number of audio events 410 for synchronization. This is because the raw audio onset times are often densely spaced within popular music. Thus, the audio onsets 406 identified by the audio onset detection process 404 are further processed by the filtering process 408 to select an appropriate subset of the audio onsets 406 for synchronization purposes. According to embodiments, the filtering process 408 may utilize the average interval between audio onsets 406, the deviation from average intervals, the intensity of the audio onsets 406, or other factors to filter the audio onsets 406 into an appropriate number of audio events 410.

Figure 5:
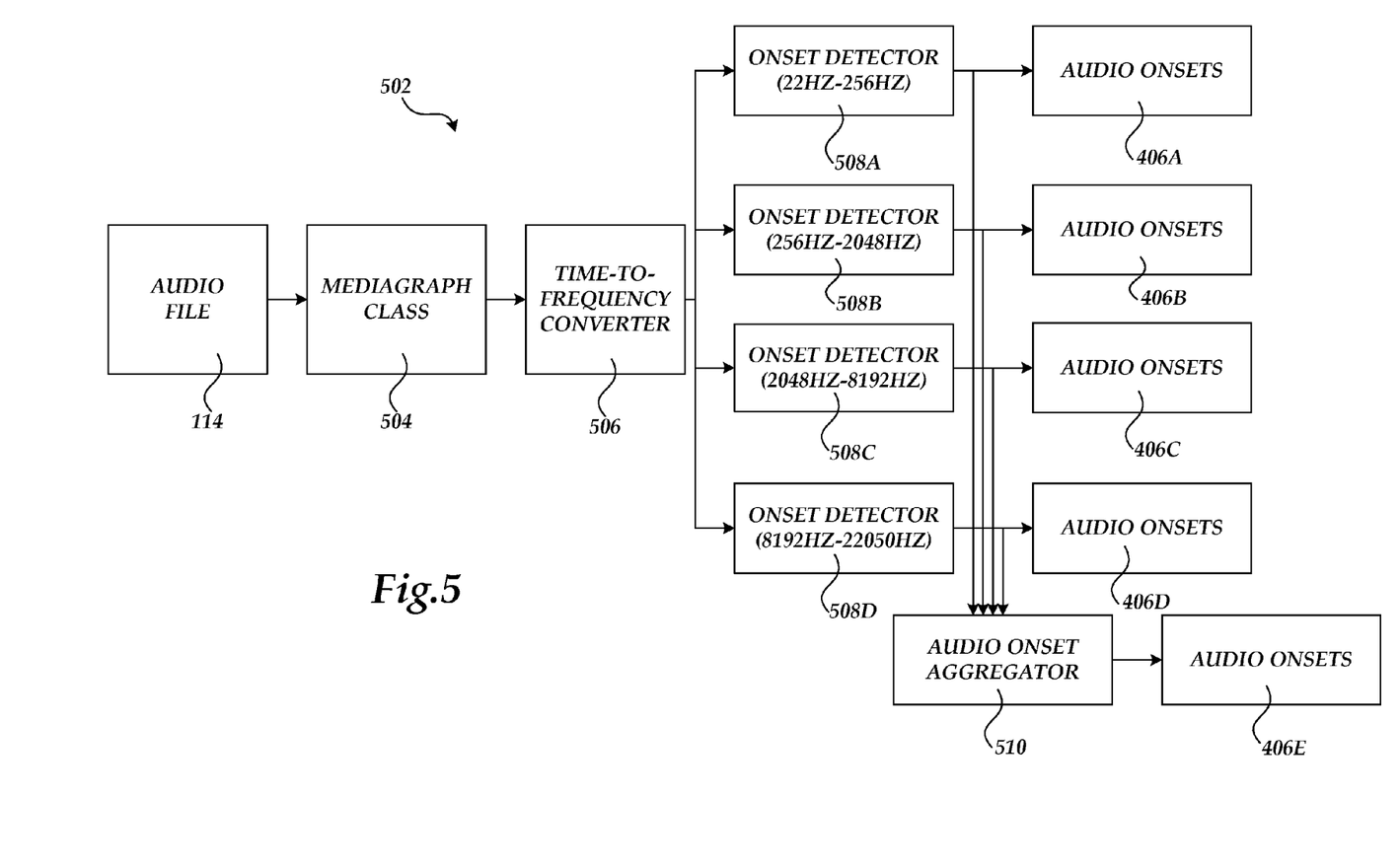
FIG. 5 is a software architecture diagram showing aspects of a software architecture for identifying audio onsets within an audio file in one implementation presented herein.

Referring now to FIG. 5, an illustrative software architecture 502 for performing the audio onset detection process 404 mentioned briefly above with respect to FIG. 4 will be described. In the implementation shown in FIG. 5, the audio file 114 is loaded and converted into a continuous stream of raw audio samples in the WAV audio format. This is done by the MEDIAGRAPH class 504, which utilizes MICROSOFT DIRECTSHOW technology to decode the audio data into waveform samples.

The audio sample stream output by the MEDIAGRAPH class 504 is fed into the time-to-frequency converter 506, which performs a Short-Time Fourier Transform ("STFT") on the samples to obtain a stream of frequency spectra. In one implementation, the time-to-frequency converter 506 maintains a buffer that acts as a sliding window over the stream of audio samples. When the buffer is full, the time-to-frequency converter 506 first applies a windowing function over the data to make the data at both ends of the buffer approach zero. Then, a Fourier transform is applied to the windowed data using a Fast Fourier Transform ("FFT") algorithm. The buffer, acting as a sliding window, then moves forward to accept new audio samples.

To compensate for energy attenuation due to the application of the windowing function, the sliding window does not move forward for a full buffer size in one embodiment. Instead, an overlapping factor can be specified to allow for partial window advancements. In one implementation, the time-to-frequency converter 506 uses the following parameters: a buffer size of 2048 samples; a Hamming windowing function; and an overlapping factor of 0.5. This implementation also allows easy customization of these parameters. For example, a Hann windowing function and an overlapping factor of 0.75 could instead be utilized. The Hamming and Hann windowing functions are known to those skilled in the art.

The stream of frequency spectra from the time-to-frequency converter 506 is converted into streams of energy values corresponding to several sub-bands. This is performed by squaring the magnitudes of FFT output bins that correspond to each sub-band frequency range and summing them together. In the implementation illustrated in FIG. 5, there are four sub-bands: 22 Hz-256 Hz, 256 Hz-2048 Hz, 2048 Hz-8192 Hz, and 8192 Hz-22050 Hz (assuming an audio sampling rate of 44100 Hz). It should be appreciated that the sub-band ranges can be modified to specify arbitrary sub-band divisions.

Each of the energy value streams is fed into a corresponding onset detector 508A-508D. Each onset detector 508A-508D produces a list of time values, the audio onsets 406A-406D, at which abrupt energy changes occur, along with their corresponding energy values. An audio onset aggregator 510 combines these sub-band onsets 406A-406D into one set of audio onsets 406E. Additional details regarding the operation of the onset detectors 508A-508D are provided below with respect to FIG. 6.

Figure 6:
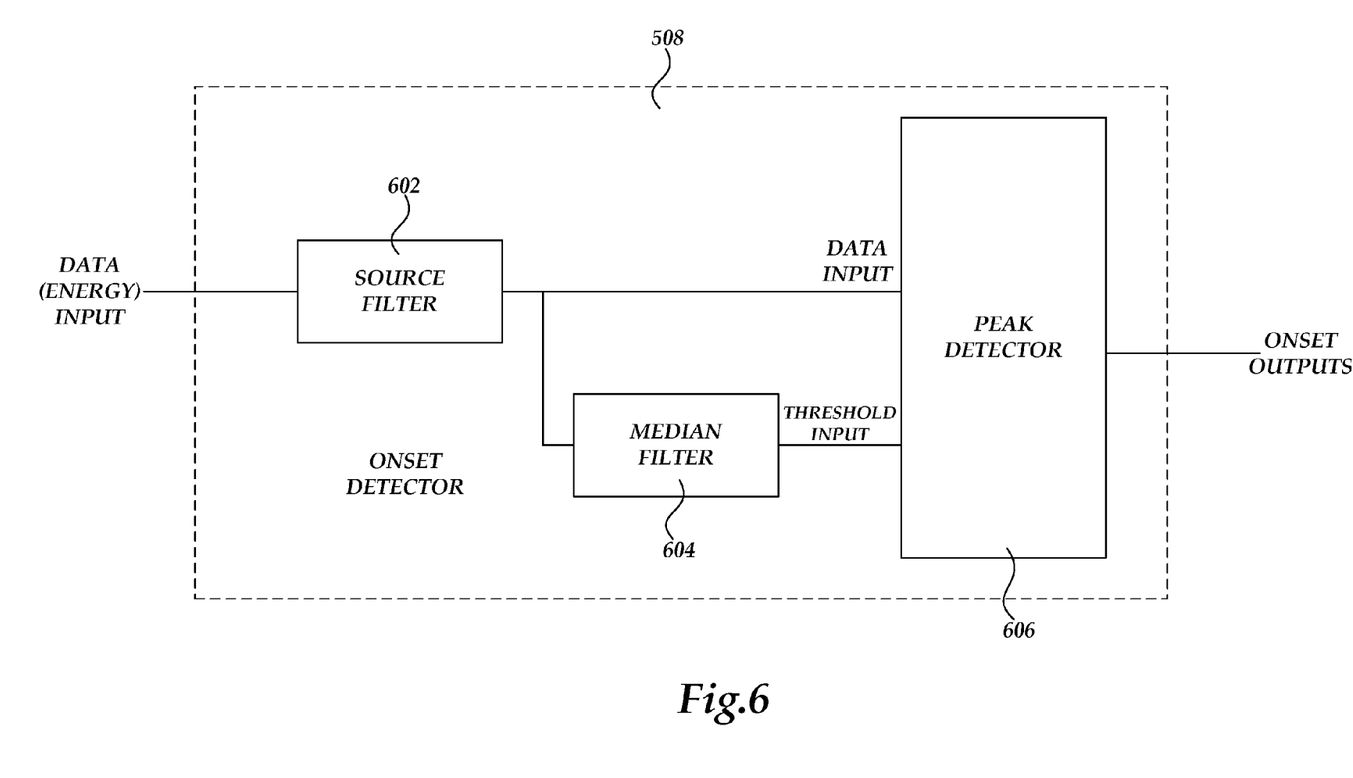
FIG. 6 is a software architecture diagram showing aspects of an onset detector provided by and utilized in one embodiment presented herein.

Turning now to FIG. 6, additional details will be provided regarding an onset detector 508. As shown in FIG. 6, each onset detector 508 includes a source filter 602. The source filter 602 receives the input value streams and attaches time indices to the data values. Each onset detector 508 also includes a media filter 604. The median filter 604 receives the timed data stream from the source filter 602 and computes a moving median average of the input data. The window size of this moving median is customizable.

The output of the median filter 604 is used as a threshold curve for the peak detector 606. The peak detector 606 receives the output of the source filter 602 as its data input and the output of the median filter 604 as its threshold input. The peak detector 606 identifies peaks among data that are above a threshold. The output of the peak detector 606 is the output of the onset detector 508. It should be appreciated that the software architecture and methodology described with reference to FIGS. 5-6 is merely illustrative and that other technologies may be utilized to identify audio events 410 within an audio file 114.

Figure 7:
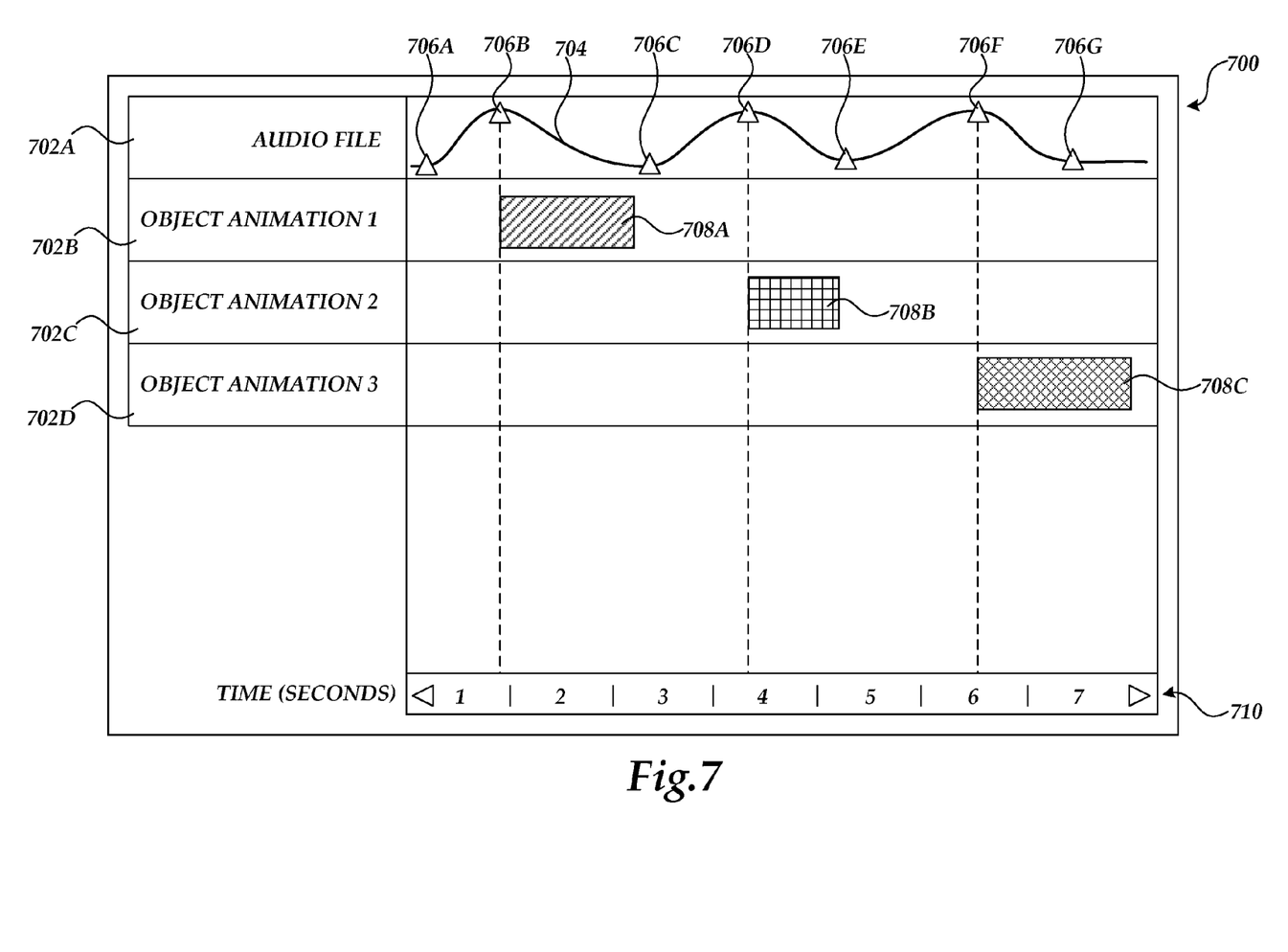
FIG. 7 is a user interface diagram showing an illustrative user interface for viewing audio events within an audio file and manually assigning the audio events to slide show events within a presentation document according to one embodiment.

Referring now to FIG. 7, an illustrative user interface 700 for viewing audio events within an audio file and manually assigning the audio events to slide show events within a presentation document will be described. As shown in FIG. 7, in one embodiment the user interface 700 includes a number of lanes 702A-702D. The lane 702A provides a graphical representation of the contents of the audio file 114 in the form of a waveform 704. Displayed in conjunction with the waveform 704 are one or more indicators 706A-706G that correspond to the identified audio events 410 within the audio file 114. The indicators 706A-706G graphically represent the location of each identified audio event within the audio file 114.

The lanes 702B-702D graphically illustrate the timing of the any defined slide show events. For instance, in the example shown in FIG. 7, slide show event time objects 708A-708C are displayed within the lanes 702A-702D that correspond to three slide show events. The width of each of the slide show event time objects 708A-708C graphically represents the duration of the event.

The location of each slide show event time object 708A-708C with relation to the timeline 710 represents the time at which the corresponding slide show event will be performed. In the example shown in FIG. 7, the event time object 708A is aligned with the indicator 706B, thereby indicating that the corresponding slide show event will be triggered at the time of the audio event corresponding to the indicator 706B. The event time object 708B is aligned with the indicator 706D, thereby indicating that the corresponding slide show event will be triggered at the time of the audio event corresponding to the indicator 706D. The event time object 708C is aligned with the indicator 706F, thereby indicating that the corresponding slide show event will be triggered at the time of the audio event corresponding to the indicator 706F. It should be appreciate, therefore, that the user interface 700 provides a graphical view of how the audio events have been synchronized with slide show events by the audio synchronization component 112.

According to one embodiment, the user interface 700 shown in FIG. 7 also provides functionality for allowing a user to manually adjust the synchronization of slide show events with audio events represented on the waveform 704. For instance, using an appropriate user input device, a user could move one of the event time objects 708A-708C along the timeline 710. In response thereto, the start and/or ending time of the event time object will "snap" to the indicators 706A-706G corresponding to the audio events shown on the waveform 704. In this manner, the user interface 700 provided herein allows a user to visually associate a slide show event with any audio event 410 identified within an audio file 114. It should be appreciated that the user interface 700 shown in FIG. 7 is merely illustrative and that other types of user interface implementations may be utilized for providing this functionality.

Figure 8:
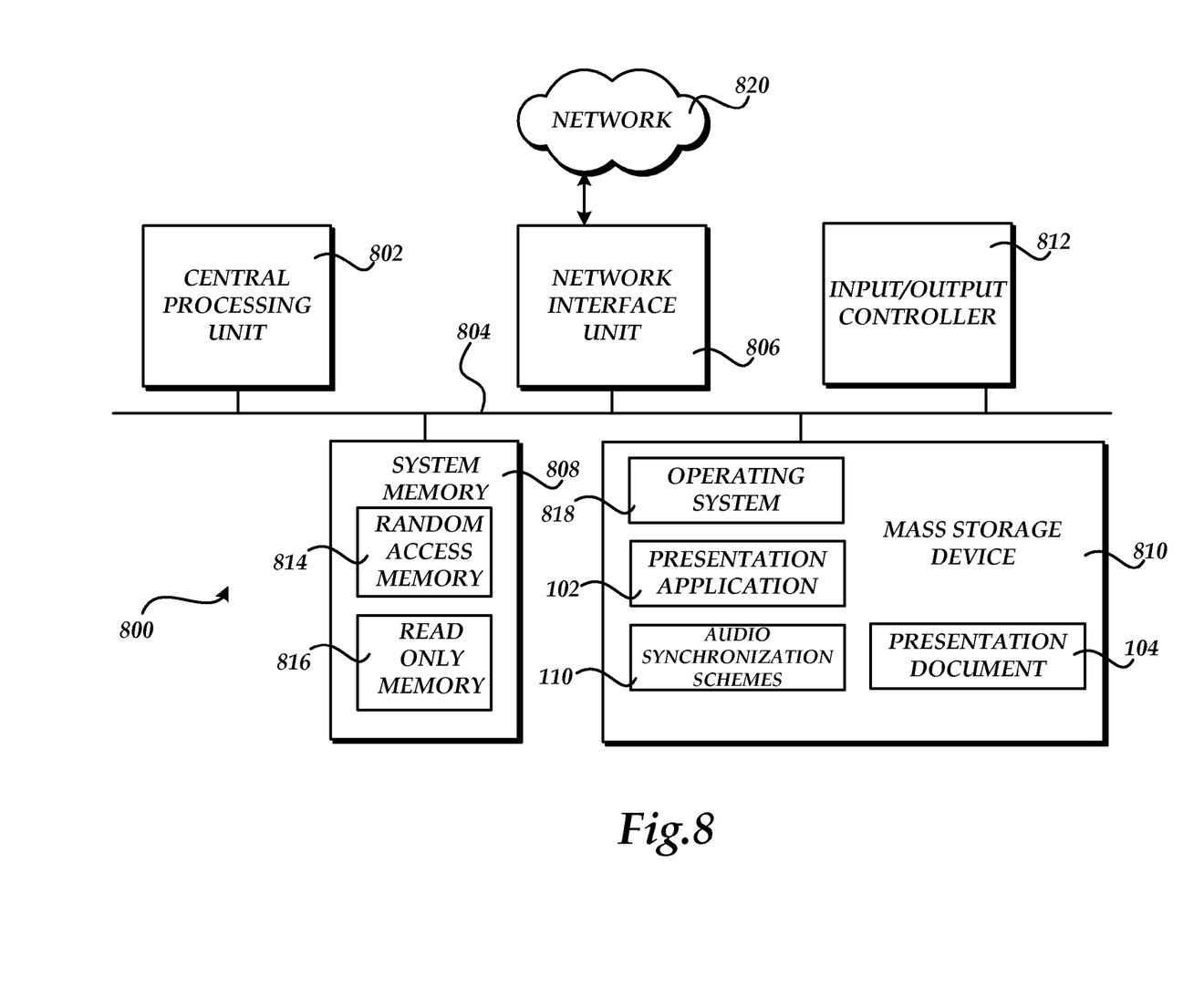
FIG. 8 is a computer architecture diagram showing an illustrative computer hardware and software architecture for a computing system capable of implementing the embodiments presented herein.

FIG. 8 shows an illustrative computer architecture for a computer 800 capable of executing the software components described herein for synchronizing slide show events with audio events in the manner presented above. The computer architecture shown in FIG. 8 illustrates a conventional desktop, laptop, or server computer and may be utilized to execute any aspects of the presentation application 102 described herein. As mentioned above, the computer 800 may also execute other types of application programs that embody the concepts presented herein for synchronizing animation events, visual effects, or transitions with audio events.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules. In particular, the mass storage device 810 and the RAM 814 may store a presentation application 102 that provides the functionality described herein for synchronizing slide show events with audio events. The mass storage device 810 and RAM 814 may also store the audio synchronization schemes 110 and a presentation document 104, both of which have been described above.

Based on the foregoing, it should be appreciated that technologies for synchronizing slide show events with audio events are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for synchronizing one or more animation events with one or more audio events, the method comprising:
    receiving data defining the animation events;
    receiving a selection of an audio file;
    processing the selected audio file to identify the audio events;
    receiving a selection of one of a plurality of audio synchronization schemes, each of the audio synchronization schemes comprising data defining how the audio events are to be synchronized with the animation events and configured to create a mood when utilized to synchronize the animation events to the identified audio events;
    determining based upon the selected audio synchronization scheme whether each audio event should be synchronized with a beginning or an end of a corresponding animation event;
    determining based upon the selected audio synchronization scheme whether all or a subset of the audio events should be synchronized with the animation events; and using the selected audio synchronization scheme to adjust a timing of the animation events to correspond to the identified audio events, thereby synchronizing the animation events to the identified audio events.

2. The method of claim 1, wherein processing the selected audio file to identify the audio events comprises processing the audio file to identify one or more audio onsets contained therein and filtering the audio onsets to identify the audio events, the audio onsets comprising time points in the audio file at which an audio energy level at a particular frequency rises above or falls below a specified threshold.

3. The method of claim 1, wherein each of the audio synchronization schemes further comprises data specifying an offset between each audio event and a corresponding animation event.

4. The method of claim 1, further comprising:
displaying a graphical user interface comprising a first lane having a waveform displayed therein that represents the audio file and having one or more indicators displayed upon the waveform that correspond to the identified audio events; and
displaying one or more additional lanes in the graphical user interface, each of the additional lanes corresponding to one of the animation events and having at least one object displayed therein corresponding to an animation event, the width of each object corresponding to a duration of a corresponding animation event.

5. A method for synchronizing one or more slide show events defined within a presentation document with one or more audio events, the method comprising:
receiving user input defining the slide show events within a presentation application program;
receiving a selection of an audio file;
receiving a selection of one of a plurality of audio synchronization schemes, each of the audio synchronization schemes associated with a mood, and each of the audio synchronization schemes comprising data defining how the audio events are to be synchronized with the slide show events;
determining based upon the selected audio synchronization scheme whether each audio event should be synchronized with a beginning or an end of a corresponding slide show event;
determining based upon the selected audio synchronization scheme whether all or a subset of the audio events should be synchronized with the slide show events;
receiving a request to synchronize the slide show events with audio events in the selected audio file using the selected audio synchronization scheme;
in response to receiving the request, processing the selected audio file to identify the audio events; and
using the selected audio synchronization scheme to adjust a timing of the slide show events to correspond to the identified audio events, thereby synchronizing the slide show events to the identified audio events using the selected audio synchronization scheme.

6. The method of claim 5, wherein the slide show events comprise animation events.

7. The method of claim 5, wherein the slide show events comprise slide transitions.

8. The method of claim 5, wherein the slide show events comprise the application of visual effects to an object within the presentation document.

9. The method of claim 5, further comprising:
displaying a user interface comprising a waveform representing the audio file; and
displaying on the waveform one or more indicators corresponding to the identified audio events.

10. The method of claim 9, wherein the user interface further comprises a slide show event time object corresponding to each of the slide show events, and wherein each slide show event time object can be snapped to an indicator displayed on the waveform.

11. The method of claim 10, wherein the waveform is displayed in a first lane and wherein the slide show event time objects are displayed in one or more other lanes.

12. The method of claim 5, wherein each of the audio synchronization schemes further comprises data specifying an offset between each audio event and a corresponding animation event.

13. A computer-readable media having computer-executable instructions stored thereon which, when executed by a computer, cause the computer to:
store a plurality of audio synchronization schemes, each of the audio synchronization schemes corresponding to a mood, and containing data defining how audio events are to be synchronized to animation events;
receive data defining the animation events;
receive a selection of an audio file;
process the selected audio file to identify the audio events;
receive a selection of one of the plurality of audio synchronization schemes;
receive a request to synchronize the animation events with audio events identified in the selected audio file using the selected audio synchronization scheme;
determine based upon the selected audio synchronization scheme whether all or a subset of each audio event should be synchronized with a beginning or an end of a corresponding animation event;
determine based upon the selected audio synchronization scheme whether the audio events should be synchronized with the animation events; and
in response to receiving the request, to use the data stored in the selected audio synchronization scheme to adjust a timing of the animation events to correspond to the identified audio events, thereby synchronizing the animation events with the audio events.

14. The computer-readable media of claim 13, wherein each of the audio synchronization schemes further comprises data specifying an offset between each audio event and a corresponding animation event.

15. The computer-readable media of claim 13, having further computer-executable instructions stored thereon which, when executed by the computer, cause the computer to:
display a graphical user interface comprising a first lane having a waveform displayed therein that represents the audio file and having one or more indicators displayed upon the waveform that correspond to the identified audio events; and
display one or more additional lanes in the graphical user interface, each of the additional lanes corresponding to one of the animation events and having at least one object displayed therein corresponding to an animation event, the width of each object corresponding to a duration of a corresponding animation event.

* * * * *